S. Costill,
Hollow Auger,
N° 2,118.
Patented June 7, 1841.
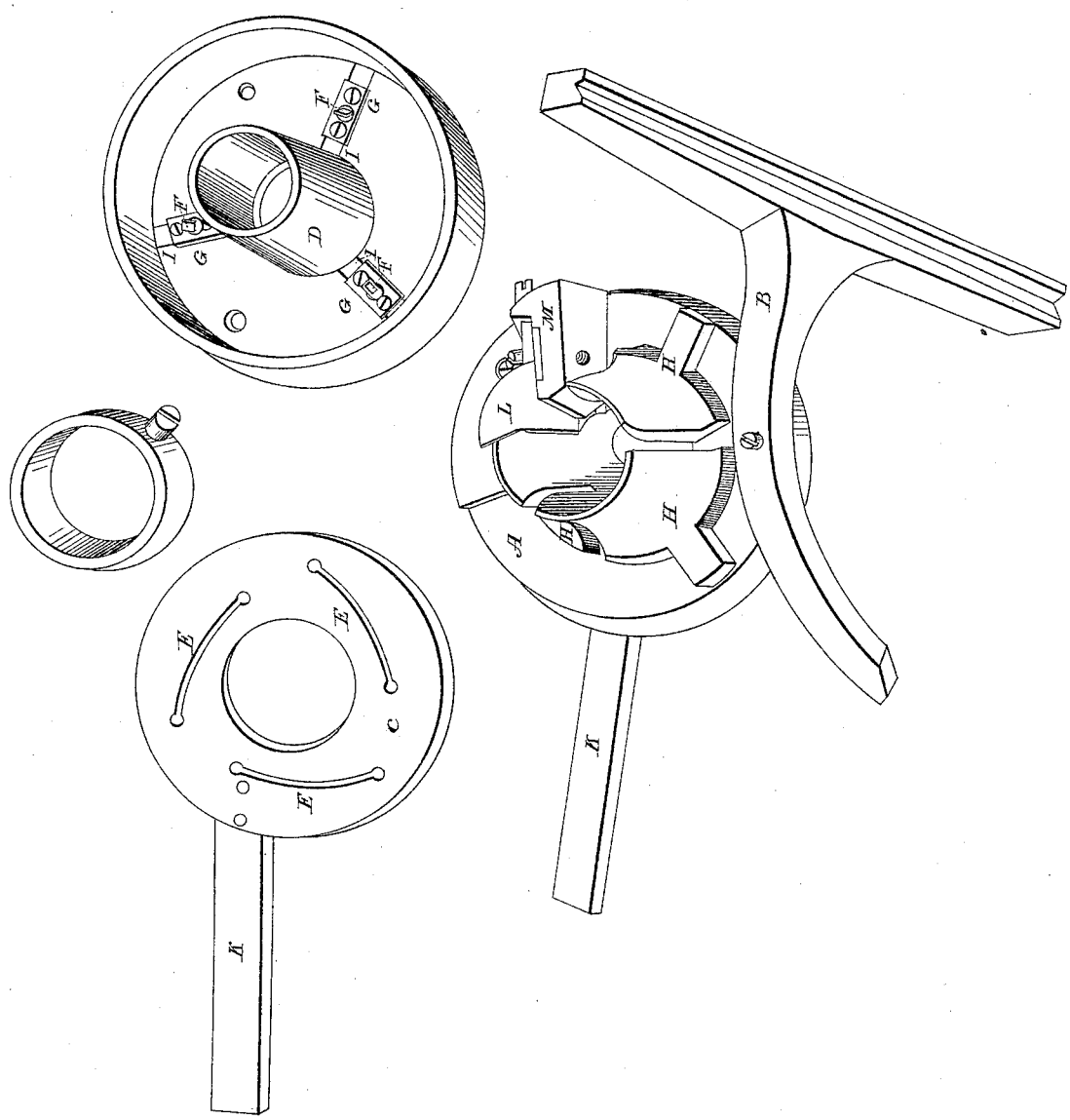

UNITED STATES PATENT OFFICE.

STACY COSTILL, OF PHILADELPHIA, PENNSYLVANIA, ASSIGNOR TO COLLINS & WISTAR.

MACHINE FOR TURNING HANDLES, POLES, &c.

Specification of Letters Patent No. 2,118, dated June 7, 1841.

*To all whom it may concern:*

Be it known that I, STACY COSTILL, of the city of Philadelphia, in the county of Philadelphia and State of Pennsylvania, have invented Improvements in Machines for Turning Handles, Poles, &c., of which the following is a specification.

This machine is formed by two plates A, one of which is attached to the carriage B, of a slide lathe and may be moved by machinery or by hand in the process of turning. The second plate C is fitted on a hub D projecting from one side of the first plate A, so as to rotate to and fro upon it and has on its inner surface, three or more eccentric grooves, E, E, E, which receive pins F F F, that are attached to slides G G G, which fasten to movable segments H, H, H, on the outer surface of the first plate and pass through holes I, I, I, cut oblong into the plate. These segments may be proportioned in length to suit he thickness of the handle to be turned forming a circular orifice, capable of extention or contraction into which the handle is to be received to be turned; they project opposite to the hub and are governed entirely by the second plate which causes all the segments to approach and recede from the center and is operated by a handle K, attached to it moving on a guide connected with the lathe, either straight, curved or taper, to suit any pattern of handles etc., etc. To one of these segments must be attached a cutter L, having additional bearings M, sufficient to hold it. This cutter is turned up at one side—forming a gouge and chisel in one piece to cut down the stuff and smooth it at the same time.

The machine may be attached to a hollow mandril.

What I claim as my invention and desire to secure by Letters Patent of the United States, is—

The cutter in combination with the movable segments and these thus combined, in combination with the eccentric grooves in the plate C for the purpose and in the manner described.

STACY COSTILL.

Witnesses:
B. WYATT WISTAR,
EDWARD C. CARTER.